O. F. MORRILL.
Grid Iron.
No. 1,568.
Reissued Nov. 10, 1863.
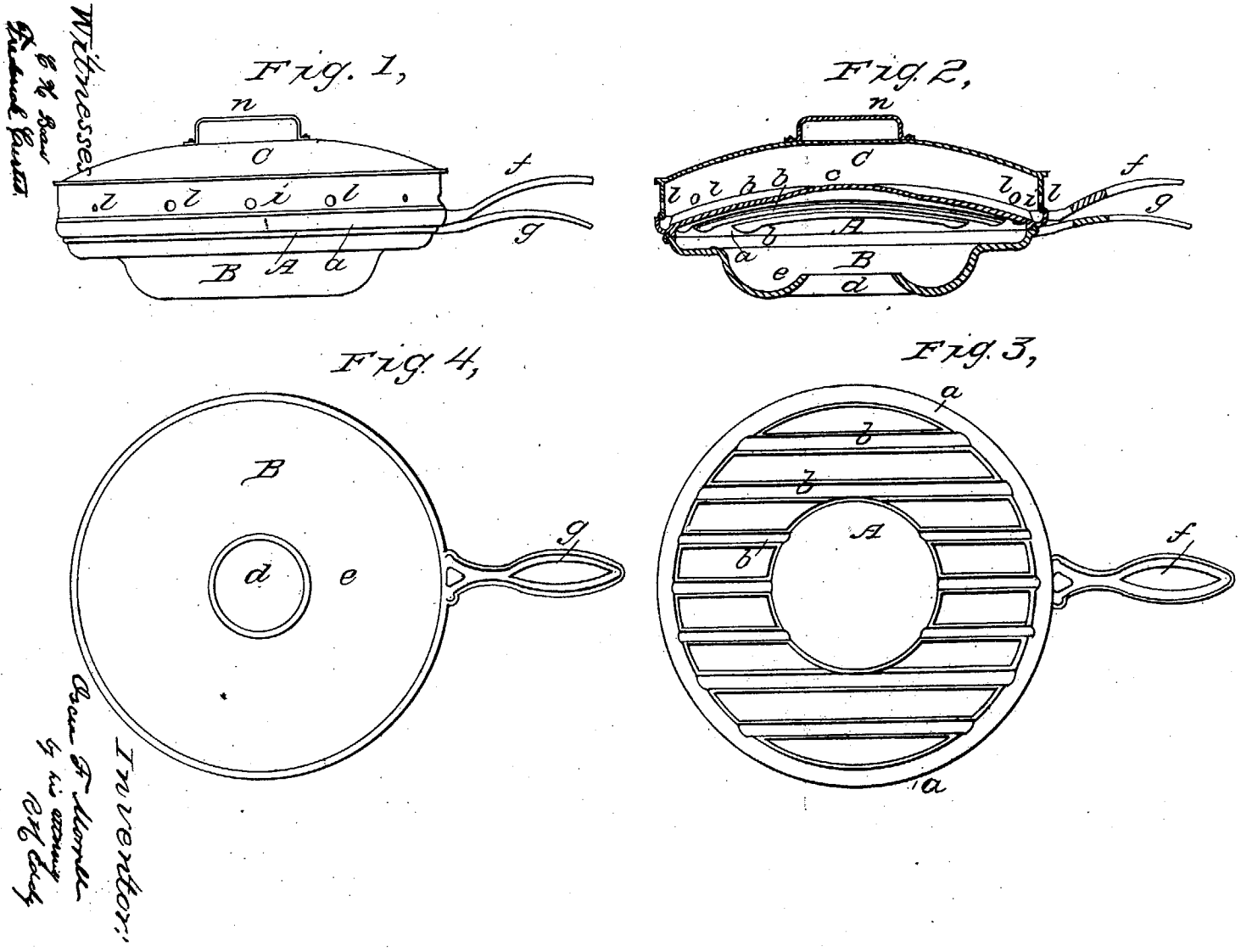
N. PETERS. Photo-Lithographer. Washington. D. C.

UNITED STATES PATENT OFFICE.

OSCAR F. MORRILL, OF CHELSEA, MASSACHUSETTS.

IMPROVEMENT IN GRIDIRONS.

Specification forming part of Letters Patent No. 26,368, dated December 6, 1859; Reissue No. 1,568, dated November 10, 1863.

*To all whom it may concern:*

Be it known that I, OSCAR F. MORRILL, a resident of Chelsea, in the county of Suffolk and State of Massachusetts, have invented an Improved Broiling Apparatus for either a Hydrocarbon, Aero-Vapor, or Aero-Gas Burner; and I do hereby declare the same to be fully described in the following specification, and represented in the accompanying drawings, of which—

Figure 1 is a side elevation, and Fig. 2 a transverse section of the same; Fig. 3, a top view of a grid or gridiron, and Fig. 4 a top view of its gravy-pan.

The said broiling apparatus is composed of two principal parts, A and B, furnished with a cover, C, each being circular in shape horizontally. The part A is made somewhat like a common gridiron, or is composed of a ring or annulus, *a*, and a series of bars, *b b*, &c., the latter being arranged parallel to one another and across the annulus, as shown in the drawings, and each of the said bars as well as the annulus being concave on the upper and convex on the under side thereof. Furthermore, there is placed at the central part of the gridiron a deflector or plate, *c*, the same being formed and arranged as represented in the figures. Underneath the gridiron or part A is the drip or gravy pan B, which is constructed somewhat in the shape of a common soup-plate, except that its bottom is formed with a heat-passage, *d*, through it, and is curved upward about the said heat-passage, so as to form a gravy trough or receptacle, *e*, circumscribing the said heat-passage, while the channels in the gridiron serve to receive and collect more or less of the gravy, such as may fall between the bars will fall into and be caught by the gravy-pan. To each part A B a handle, *f* or *g*, should be applied, and so as to extend thereform, as seen in the drawings. A planished tin cover, C, rests upon the gridiron A, and is constructed at its lower part, *i*, in the form of an annulus pierced with holes or discharging-orifices *l l*, &c., the upper part of the cover being either conical or meniscus shaped, such part having a handle, *n*, arranged upon it, as shown in Fig. 1.

The culinary or broiling apparatus above described is intended to be used on a gas-stove or over an aero-vapor burner, in which case the volatile products of combustion from the burner may be supposed to pass through the orifice at the middle of the gravy-pan or part B, and to impinge against the deflector at the middle of the gridiron or part A, such deflector serving to spread the flame or current of heat in lateral directions underneath the bars of the grid or grate, so as to thoroughly and equally cook the under surface of a piece of meat when placed on the said bars. Owing to the peculiar construction of the cover and the arrangement of its heat-discharging orifices, the currents of heat that may ascend through the grate-bars into the cover will be deflected by it upon the surface of the meat, and will be finally discharged out of the holes at the lower part of the cover.

The said apparatus operates very advantageously for the purpose for which it is intended.

I claim—

1. An improved steak-broiler, as not only made or provided with a deflector for its grid, but as having a heat-passage arranged underneath such deflector, and surrounded by a gravy-trough, substantially in manner as specified.

2. The grid, as provided with a deflector arranged with respect to the bars of the grid as specified.

3. The gravy-pan, as made with a trough and a heat-passage, arranged substantially as specified.

OSCAR F. MORRILL.

Witnesses:
R. H. EDDY,
F. P. HALE, Jr.